Sept. 9, 1941.  E. G. GAGE  2,255,659
RADIANT ENERGY DISTANCE DETERMINING SYSTEM
Filed June 28, 1939   4 Sheets-Sheet 1
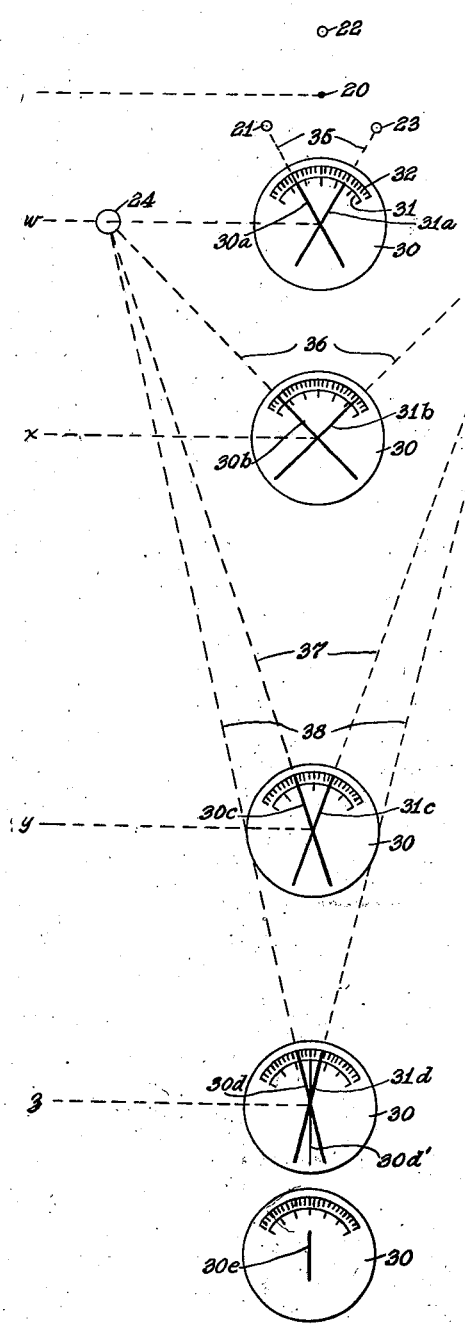
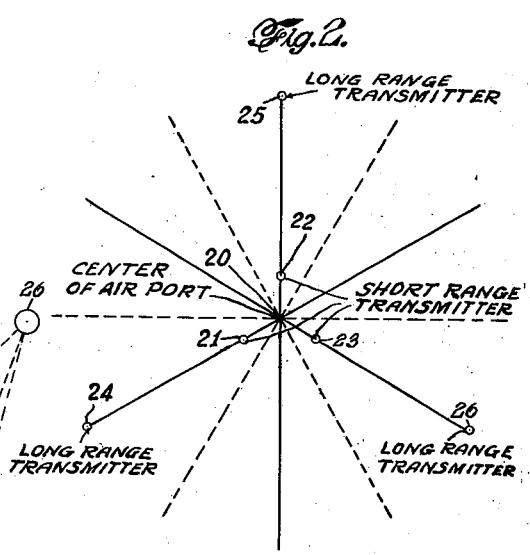
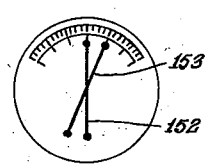
INVENTOR.
EDWARD G. GAGE
BY
ATTORNEY.

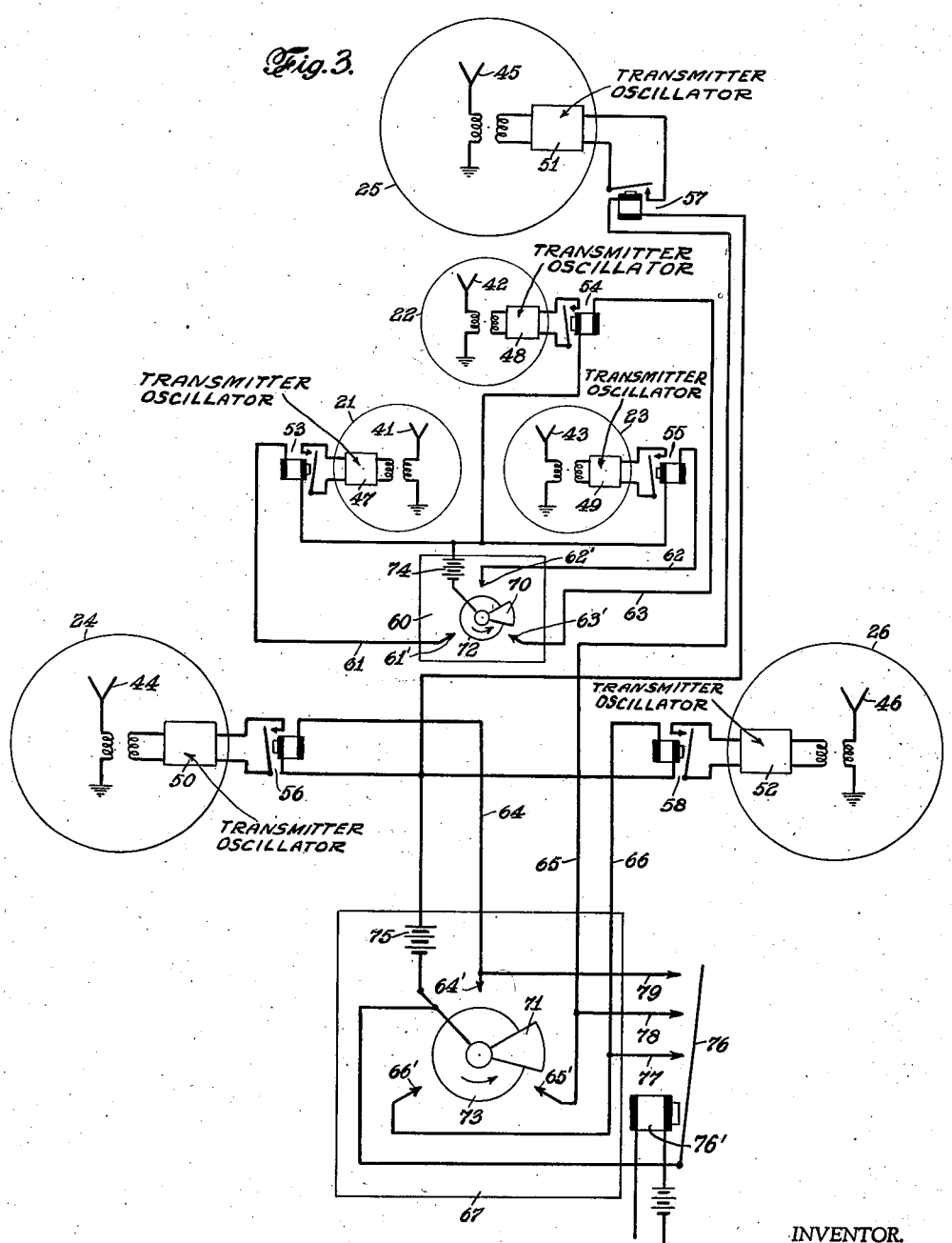

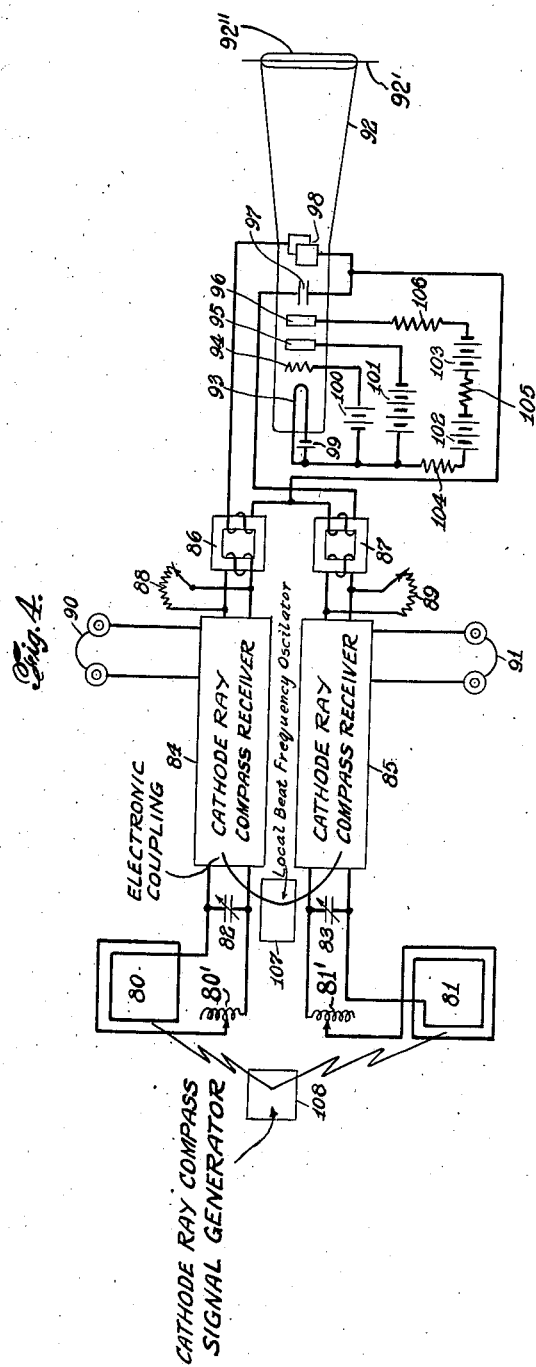

Sept. 9, 1941.  E. G. GAGE  2,255,659
RADIANT ENERGY DISTANCE DETERMINING SYSTEM
Filed June 28, 1939  4 Sheets—Sheet 4
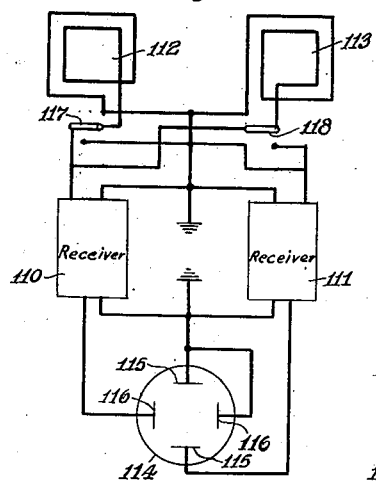
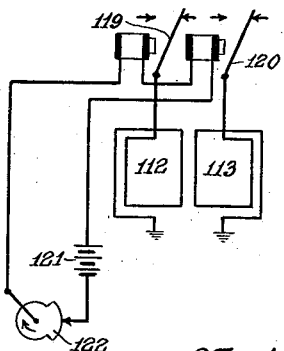
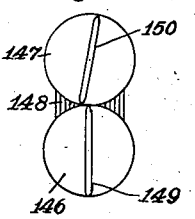
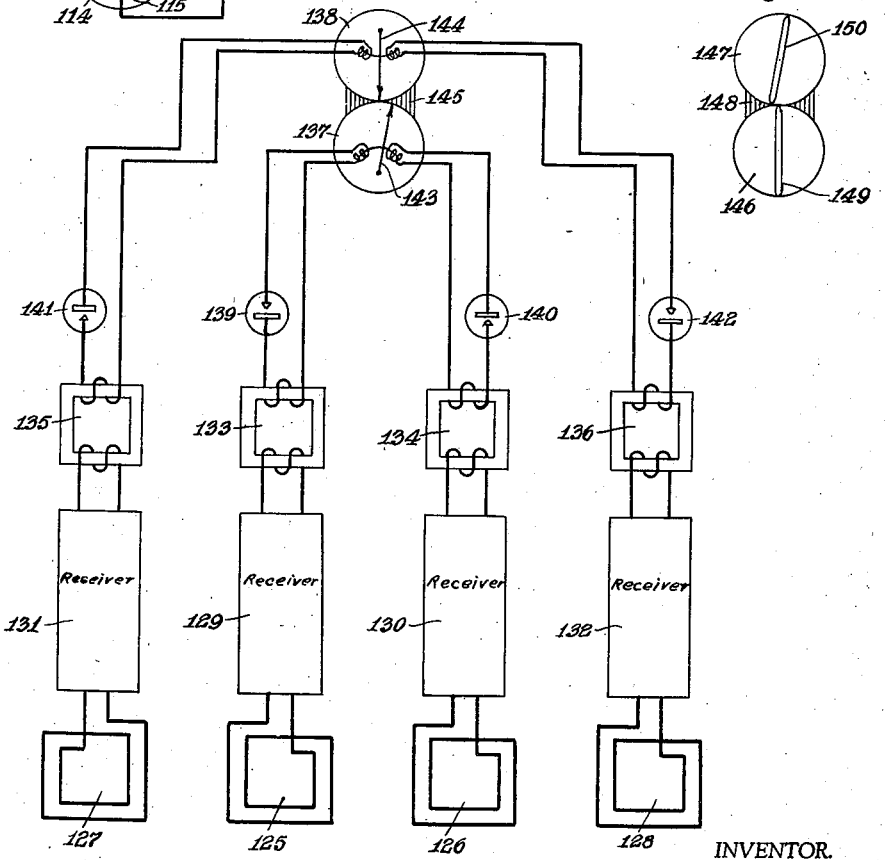
INVENTOR.
EDWARD G. GAGE
BY
ATTORNEY.

Patented Sept. 9, 1941

2,255,659

UNITED STATES PATENT OFFICE 2,255,659

RADIANT ENERGY DISTANCE DETERMINING SYSTEM

Edward G. Gage, Brooklyn, N. Y., assignor, by direct and mesne assignments, of two-thirds to Leon Ottinger, New York, N. Y.

Application June 28, 1939, Serial No. 281,511

5 Claims. (Cl. 250—2)

The invention relates to radiant energy distance determining systems of the nature set forth in my prior U. S. Patents #1,828,531, #1,939,685, #1,939,686, and #1,961,757, and to a method of determining both distance and direction of the source of radio waves.

In my U. S. Patent #1,828,531 I have disclosed a method of determining distance by receiving, on a direction-finding loop, radio signals alternately from two transmitters located a predetermined distance apart and transmitting at the same frequency. The energy received from one transmitter is used to provide a point of reference on a visual recording device, such as a sensitive meter, and the energy received from the other transmitter is used to indicate a value which may be calibrated in terms of distance. In this system it is possible to operate the receiving loop at any angle, provided that angle be always maintained after calibration.

In my U. S. Patent #1,939,685 I have disclosed another method, which embodies employing a plurality of receivers each with direction-finding loops receiving a respective frequency, the respective receivers operating a common visual indicator, such as a meter with scale calibrated in terms of distance.

In the systems disclosed in both of the aforesaid patents, there is provision for only one path of approach of a moving vehicle or mobile unit to a transmitter without changing transmitter combinations.

The present invention has for an object to provide an arrangement of the transmitting and receiving apparatus which requires a minimum number of transmitters which are used in groups to radiate a substantially 360° circular pattern at all times from a predetermined location. This will permit a moving vehicle, such as an airplane, to be guided to the center of a landing field bounded by these transmitters from substantially any direction, and will afford means for measuring the distance in any direction from the transmitters to the moving vehicle.

Another object of the invention is to provide transmitters or groups of transmitters for various distances, such as long range and short range radio beacons.

Still another object is to substitute for the aforementioned meters a cathode ray device, with a visual screen whereon is indicated both distance and direction. I am aware that the use of cathode rays for direction finding has been suggested for many years and in particular I am aware of the work of Watson Watts and Robinson of Great Britain, and of Tolson of the United States, and the improvements are not broadly directed thereto.

Other and ancillary objects will hereinafter appear.

In carrying out the invention, a plurality of electromagnetic waves are transmitted from different localities in grouped relationship to afford a substantially circular field pattern about a fixed reference point, either alternately at the same frequency or simultaneously at different frequencies. The waves from two of the transmitters are arranged to be received as on a mobile unit, either alternately in the former case or simultaneously in the latter case, and their directional effects compared as a measure of the distance between the point of reference and the said unit.

The nature of the invention, however, will best be understood when described in connection with the accompanying drawings, in which:

Fig. 1 is a diagrammatic view illustrating the operation of the novel system.

Fig. 2 is a schematic drawing of a group of radio beacon transmitters and their field patterns as to direction.

Fig. 3 is a diagrammatic view of the transmitting equipment and circuits; and Fig. 4 is a similar view of the receiving equipment and circuits.

Fig. 5 is a front elevation of an airplane with loop receivers installed in accordance with the invention; and Fig. 6 is a similar view illustrating a modification.

Fig. 7 illustrates diagrammatically an arrangement for exchanging receiver apparatus; and Fig. 8 illustrates switch operating mechanism therefor.

Fig. 9 is a diagrammatic representation of a modified form of receiver apparatus; and Fig. 10 is a plan view of a modification of the indicating instrument which may be used therein.

Figs. 11 and 12 are plan views of the viewing screen of a cathode ray tube used in the novel system.

Referring to the drawings, more particularly Figs. 1 and 2 thereof, 20 indicates a central location from which a beacon is calibrated and may for convenience be the center of an airport. This point is surrounded by a first group of beacons 21, 22, and 23 comprising a transmitting unit with the individual stations arranged in polygonal formation, in the present embodiment triangular. These beacons are small low-power transmitters and are preferably located on the boundaries of the airport, with a distance of approximately one-half mile between beacons and which in all cases will be less than the distance between the point 20 and receiver apparatus hereinafter set forth. They are to be operated in sequence or simultaneously, and may either be complete transmitters with antenna, and energized by remote control, or they may consist of an antenna only, being fed from a common transmitter in rotation, all of which is well understood and forms no part of the present invention.

A second group or unit of beacons surrounding the first group is indicated at 24, 25, and 26 and is similarly distributed. These beacons may be of high power and are preferably located either on the boundary of the city in which the airport is located, with an approximate distance of five miles between beacons, or they may be located in different cities or suburbs surrounding the airport, with an approximate distance of ten or fifteen miles between beacons. The triangular formation should be preferably adhered to for reasons hereinafter set forth.

A short-range calibrated scale 31 is provided on the screen 30 of the cathode ray tube, together with a long-range calibrated scale 32. The different angles formed by the paths of reception from, for example, the beacons 21 and 23 and from beacons 24 and 26 at the various distances of the receiving apparatus are merely continuations of the image or signal lines 30a, 30b, 30c, 30d, and 30e of the viewing screen 30, and signal lines 31a, 31b, 31c, and 31d.

Thus, the dotted lines 35 indicate the angle of the paths from stations 21—23 at a distance w from the point 20; the dotted lines 36, the angle formed by the paths of reception from beacons 24—26 at the distance x; the dotted lines 37, the paths from beacons 24—26 at the distance y; and the dotted lines 38, the paths from beacons 24—26 at the distance z.

The indication 30e, which is a single line, represents reception from either the long- or the short-range beacon at distances approaching infinity.

The location, for example, of beacons 21, 22, and 23 would be substantially the same as indicated in Fig. 2, being grouped in spaced relationship to form an equilateral triangle; and beacons 24, 25, and 26 are then located substantially similarly but over a considerably greater area and outside the boundary of the said beacons 21, 22, and 23. The full lines shown in Fig. 2 as passing through the center of the two groups of transmitters indicate the six main paths of approach which a moving vehicle may take to the common center of the two transmitter groups, while the dotted lines indicate the six auxiliary paths of approach of the moving vehicle.

A schematic diagram of the transmission circuits of both short- and long-range beacons is shown in Fig. 3, wherein the transmitting stations are shown as located at the corners of a triangle, the long-range beacons of high power being indicated at 24, 25, and 26; the low-power transmitters of the short-range beacons, at 21, 22, and 23. The distance between beacons of each leg of the triangle of the long-range group may be, for convenience, twenty times the distance between beacons of the short-range beacon group.

The respective antennae of the short-range group, which may be of the simple vertical radiator type having a 360° pattern, are designated 41, 42 and 43, respectively; while the antennae of the long-range group, which may be of the same type as the short-range beacon but of larger dimensions, are designated 44, 45, and 46, respectively.

Complete transmitting equipment 47, 48, and 49 is provided for each beacon of the short-range group; and, similarly, equipment 50, 51, and 52, for the long-range group. Remote control relay devices may be associated with the transmitters for operating each transmitter independently, for example, electromagnetic relays 53, 54, and 55 for the short-range group and similar relays 56, 57, and 58 for the long-range group. Land lines 61, 62, and 63 are provided between the short-range beacons and a control room 60 which may be located centrally as regards the triangular group of beacons, or may be located at some distance from them. In like manner, land lines 64, 65, and 66 from the long-range group are provided to a control room 67, which also may be located similarly to the short-range control room.

Respective cam keys 70 and 71 may be provided at the control rooms 60 and 67 for energizing successively the respective control lines; and these keys are rotated by suitable mechanism such as electric motors 72 and 73, respectively, the key 70 being adapted for engagement with the contact arms 61', 62', and 63' controlling the relays of the three beacons of the short-range group, and the key 71 with the contact arms 64', 65', and 66' controlling the relay of the long-range beacon group. Suitable power for this purpose may be obtained from the energizing batteries 74 and 75, respectively.

In addition, there is provided a manual control switch 76 having contacts 77, 78, and 79 whereby all beacons of the long-range group may be manually controlled simultaneously for operating certain circuits hereinafter described. The same manual control may also be applied to the short-range group, if desired.

In Fig. 4 is shown a schematic diagram of the receiving circuits of the novel distance and direction-finding system, wherein 80 and 81 indicate direction-finding loops fixed at an angle preferably of 22½°, although any angle may be used. These loops are connected through variable inductances 80' and 81', respectively, to tuned condensers 82 and 83 for the respective loops; and two substantially identical conventional Watson Watts cathode ray compass receivers 84 and 85 are connected therewith. Such receivers are resistance-coupled, as is well understood, and deliver both radio- and audio-frequency oscillations to the output circuit. The output of each receiver is connected to this end to a corresponding output transformer 86 and 87 having attenuation or variable shunt resistances 88 and 89 connected respectively across the primary of these transformers. Telephones or aural indicators 90 and 91 may be associated with the corresponding amplifiers.

The outputs from the aforesaid receiving apparatus are connected to a cathode ray tube 92 having the directly heated cathode 93, a control grid 94, the first anode 95 and the second anode 96, as well as the horizontal deflecting plates 97 and the vertical deflecting plates 98. A cathode heating battery is indicated at 99 and the grid control battery at 100, while 101 designates the anode No. 1 battery and 102 one section of anode No. 2 battery, as is the usual practice except for grounding of the anode 96. Between this section and another section 103 of the same battery are interposed high resistances 104, 105, and 106, each section of the battery being of comparatively low voltage though adequate to provide ample current flow for operation of the tube, thereby protecting the operator from dangerous shock. These resistances do not objectionably affect the cathode ray beam for the reason that the current drawn by the second anode 96 is of the order of magnitude of but 2 or 3 milliamperes, and the said resistances allow a considerably larger current than this to pass on short-circuit. The resistances being in series, they produce a large current loss but with a small voltage drop because of the slight drain by the second anode 96 of the cathode ray tube on the batteries and because there is no shunt resistance across said battery. The batteries may comprise very small dry cells, or the high voltage may be obtained from a transformer or generator.

These resistances are of the order of 20,000 ohms each, and are sufficient to pass the very small current necessary for the cathode ray; but, upon contact by a person, immediately produce a voltage drop to a very low value and practically no shock is felt. Regardless of the point in the high-voltage circuit where contact is made, it is impossible to get a dangerous shock either through ground or across terminals, as the resistances may be inserted between the batteries or generator and any conductor likely to be contacted.

A local beat frequency oscillator 107 tuned to beat with the incoming signals at any frequency suitable for the production of a satisfactory signal line may be associated with the receiver apparatus, as well as a local generator 108 for testing the equality of the receivers and the reference line of the loops 80 and 81. This local wave generator 108 is the conventional signal generator commonly used to test the equality of a Watson Watts cathode ray compass; and the beat frequency oscillator 107 is the ordinary heterodyne source for producing a beat note from incoming continuous waves. Of course, if modulated waves are employed at the transmitters, the beat frequency oscillator 107 may be dispensed with.

In Fig. 5 is shown a conventional plane 109 indicating the location of the loops 80 and 81.

Fig. 7 shows an arrangement for switching either one of a pair of identical receivers 110 and 111 to either of two loops 112 and 113, the receivers being connected to a cathode ray tube 114 with two pairs of deflecting plates 115 and 116, each pair operating from its corresponding receiver. Suitable switches 117 and 118 are provided for this purpose and may be in the nature of electromagnetic switches 119 and 120, Fig. 8, operated from a battery 121 by a motor-driven cam 122.

It will be appreciated, also, that any direct indicating radio compass may be used with my novel system instead of a cathode ray device, for example, as shown in Fig. 9 in which is illustrated also another form of receiver which may be used with my transmitting system. In this embodiment one pair of loops 125, 126, fixed 90° apart and tuned to one frequency, is provided, together with a second pair of loops 127, 128 fixed 90° apart and tuned to another frequency.

Respective receivers 129, 130 for loops 125, 126 and receivers 131, 132 for loops 127, 128 are provided and connect through respective output transformers 133, 134 for receivers 129, 130, and 135, 136 for receivers 131, 132 with measuring meters 137 and 138, respectively, there being included intermediate the transformers and meters corresponding rectifiers 139, 140, 141 and 142. Meter 137 responds to one frequency and is provided with a needle 143, while the measuring meter 138 responds to the other frequency, and has also a needle 144. These two needles are arranged with their points as close together as possible and an intermediate and common scale 145 is provided between them.

The one needle, as the needle 144, may then be used as a reference marker in association with needle 143 to indicate the distance as shown in my U. S. Patent #1,967,757. In the case of cathode ray instruments, two such instruments 146 and 147, Fig. 10, may be similarly juxtaposed with intermediate scale 148, two images 149 and 150 in the nature of narrow ellipse-like indicators cooperating therewith. The disposition of the two pairs of loops may be such that one pair fixed at a 90° angle will be located on the top of the plane, Fig. 6, and the other pair also fixed at a 90° angle will be located at the bottom of the plane. Each pair of loops with its receiver and meter form a single-needle, direct-reading radio compass, and their relative readings may be used to indicate the distance by calibration, similar to the two signal lines of the cathode ray viewing screen shown in Fig. 1.

The operation of the novel system of distance-finding is as follows:

Assuming that an airplane is equipped with the receiving apparatus and is flying toward a group of long-range beacons, such as shown in Fig. 2. The transmitting beacons 24, 25, and 26 will then be maintained in operation at a single frequency, although different frequencies may be employed as hereinafter set forth.

These beacons are switched on in regular sequence by the rotating cam 71 and are so timed that the intervals of operation do not quite overlap, there being a short, idle period between beacon transmissions.

The speed of change-over from one beacon to the next is sufficiently rapid to give a persistent image on the viewing screen of the receiver. As an example, the complete shift from the first beacon to the last in the series of three may be made in less than one-twenty-fifth of a second. This is accomplished by means of the rapidly revolving cam which may be similar to a commutator such as used on electric motors, with brushes bearing against it and revolving at high speed.

Still another method of operation is to close the keys 77, 78, and 79 of all three beacon transmitters simultaneously by means of the manual control switch 76, and allow it to be closed for any predetermined time interval. This may also be effected by means of the electromagnet 76′. I have found that it is almost impossible for the three beacons to remain in radio frequency phase except for negligible time intervals, so that the image on the viewing screen is substantially the same as for the rotation in sequence method. The difference is that with simultaneous operation of the beacons the image lines are somewhat irregular in density and at close range the pattern shifts due to harmonic effects from beat frequencies between beacons.

In the case of operation at different frequencies, beacons 24, 25, and 26 may be operated, for example, on 300, 325, and 350 kc respectively, and the manual control switch 76 closed to transmit all three frequencies simultaneously.

An alternate method of reception involves the use of two pairs of receivers, each with separate loops as shown in Fig. 9, each pair of loops being tuned, for example, to two selected frequencies of the three said frequencies 300, 325, and 350 kc. These should preferably be the frequencies of the two beacons which lie more nearly at right angles to the path of reception.

When it is desired to guide the approaching plane to a landing at an airport located within the zoning circles of the long-range beacons, the transmitters 21, 22, and 23 of the short-range group, as shown in Fig. 2, are set in operation in a manner similar to that of the long-range group, as by means of the cam key 70.

The signals from the distant group of long-range beacons may be either modulated or unmodulated. If modulated, the oscillator 107, Fig. 4, is not necessary except for amplification. When the plane approaches to a position within range of the beacons, the first indication on the viewing screen is a change from the spot of the cathode ray to a line, as the line 30e, Fig. 1. It is well known that if each receiver is maintained very slightly out of phase by allowing considerable audio-frequency to combine with the radio-frequency, the size of the image is increased and there is produced in addition to a straight line a very narrow ellipse, like indication 151, pointed at both ends, as shown in Fig. 11. This elliptical figure appears at either side of the "on course" line and is a convenient indication of an "off course" position. This line points to the center of the group of beacons, and as the plane approaches, it appears to split and shows in the form of three lines crossed at the center, as shown at 30d', Fig. 1. Each of these lines points to a beacon of the group. The two outer lines 30d and 31d are the ones from which distance is determined. As the loops are affixed to the plane, the plane is maneuvered until the left-hand line 30d points to zero on the viewing screen scale. The distance in miles is then read from the number on the scale 32 to which the right-hand line 31d points. The central line 30d' is used for determining central direction only and to thereby fix the relative positions of the other beacons on the screen.

The 180° error may be eliminated by the usual method of adding the vertical effect of the loops to the loop effect or noting whether the lines 30d and 31d are longer or shorter than line 30d', there being a predetermined relationship between difference in line length and direction as determined by calibration.

As the plane nears the beacon group, the angles between lines become less acute and it is possible to determine the distance with fair accuracy by simply gauging the angle on the scale by eye instead of reading the graduations from the calibrated scale, in much the same manner that one tells time without difficulty by the clock hands even though there be no numerals on the clock dial, or distance renders them unreadable.

When the plane arrives within range of the short-range beacon, which may be one-tenth the range of the long-range, the tuning of the receiver is changed to the frequency of the short-range beacons 21, 22, and 23, causing the three lines 30d, 30d', and 31d on the screen viewing to again appear as one line 30e, and then gradually splitting up into three lines, including 30a and 31a on opposite sides of 30e, the angles between these becoming wider as the plane approaches the landing field. When the three lines are in such positions that the two outer ones 30a and 31a are 90° apart, thus forming a right-angle triangle on the viewing screen with the central line forming a continuous vertical line down the screen, then the aviator knows he is near the boundaries of the airport and can glide to a landing by the usual vertical landing beams.

Instead of operating the beacons in rapid sequence to produce the effect of three separate lines at different angles, due to persistence of vision, the beacons may be operated in very slow sequence, such as one per second, by reducing the rotational velocity of cam switches 70, 71 so that the position of each line may be read separately on the scale. In this case only one line will appear on the viewing screen, and it will shift its angle with change of beacon. The plane is turned until the line is first at zero on the extreme left of the distance scale and its position pointing to a number on the scale at the extreme right of the scale indicates the distance.

In both methods of rapid or slow sequence, one signal line is used as a point of reference and the other as a measuring value, as disclosed in my aforesaid United States patents.

It will be appreciated that the paths of approach shown in Fig. 2 are such that air craft, approaching from any angle of 360°, will receive all three beacons of either long- or short-range group with substantially equal symmetry.

As an example, a plane approaching beacon 25, Fig. 2, from the south (bottom of drawing), along the full line would receive beacons 24 and 26 as outside lines 30d and 31d of the image with beacon 25 as line 30d' in the middle.

A plane approaching from the north (top of drawing) would receive the same signal pattern with the 180° error noted.

Approaching from the east (right of drawing) along the dotted line the plane would receive beacons 25 and 26 as outside lines 30d and 31d with beacon 24 invisible. This would indicate to the pilot that he was approaching the beacon group on a direct line between beacons 25 and 26 and at a slight angle thereto.

The same conditions would apply around the 360° with an error arising from the difference in approach from 90°, i. e. full line path, to any angle within the angle formed by the two sides of the triangle of the beacon group, i. e. dotted line path, which error is always clearly defined on the screen and can be calibrated accordingly.

Except under adverse weather conditions, a plane may always approach in a line at right angles to one side of the triangle, such as shown in Fig. 2 by the full lines.

It is to be understood that a complete circle of many beacons would be the ideal condition, but impractical, and I have found the hexagonal pattern to be the nearest approach, economically, to the circle.

The operation of the receiver of the system is as follows:

Two balanced, substantially identical, radio-frequency channels are carefully shielded one from the other, and each provided with separate receiving loop, and separate signal line indicators 97 and 98, as shown in Fig. 4.

In order that these receivers may at all times be substantially identical in operation, I have shown a method of insuring stability. This method consists in exchanging at intervals by means of the automatic relays 119 and 120 and the cam switch 122 the connections between a loop 112, 113, a receiver 110, 111, and an output indicator 115, 116 in such a way that each receiver is intermittently connected with the two input and the two output circuits, and any difference between indications compensated for by adjustment of amplifier gain. An alternative method may be to receive from a local oscillator 108, Fig. 4, located near the front of the plane along a center or reference line between the two loops. The indication for this method is the position of the conventional signal line 92' obtained from a beacon, which should be exactly in the center of the viewing screen and point exactly fore and aft with respect to the reference line in a manner well known to those versed in the art of cathode ray compass operation.

The image on the viewing screen when modulated signals are being received without a local oscillator, consists of a straight line 152, 153, Fig. 12, with a small ball at each end indicating the usual sine wave trace with the ball representing the interval during which the spot is stationary.

Two such lines appear at different angles when two beacons are being received, as shown in Figs. 11 and 12. When the signal is modulated with the customary 30% modulation, the signal line is nearly always a straight line, as the line 152, Fig. 12. I have found it advantageous to utilize the familiar Lissajou figures, as indicated at 151, Fig. 11, as an aid to the pilot in telling at a glance whether it is on or off course, and to what degree.

When the local oscillator 107, Fig. 4, is used, and the output signal is partly audio- and partly radio-frequency, the signal line appears straight only through approximately 22½° or 11¼° either side of the "on course" line, as the line 152, Fig. 12. Outside of this arc the signal line shows first as a very narrow ellipse, as indicated at 151, Fig. 11, and then gradually becomes a circle when the plane is "off course" 90°. The pilot therefore can tell at once by the shape of the image whether he is "on course" or approximately how far off he is.

A reference line on the screen may be provided by etching the fine line 92' on a lens 92'' covering the viewing screen. This line should point fore and aft and be both physically and electrically centralized as regards the angle formed by the two receiving loops.

When the two receivers are properly balanced, and a signal, either from a local signal generator or from a distant beacon, "on course" is received, the signal line on the viewing screen should lie exactly parallel to this reference line or as close to it as possible and still be visible. Any deviation from this line when testing for equality may be compensated for by attenuators 88 and 89 in the final stage of each receiver, as hereinbefore set forth in the receiver apparatus shown in Fig. 4 and as is well understood by those versed in the art of cathode ray compass operation.

The signal generator 108 if used may have its vacuum tube generator plate circuit fed from the same source as the receivers, therefore providing non-directional reception by electronic coupling. The size of the image on the screen may always be kept within the bounds of the screen by the attenuator controls 88 and 89 in the last stage of each receiver. I have found it advantageous when using a uni-control wave-changing switch to track the two radio-frequency channels of the receiver by means of variable inductances 80' and 81' instead of the usual trimmers and padders. It is important that the inductances of each loop be identical and this method makes this feature possible.

I have found that for distance-finding it is not absolutely necessary that the two receivers have identical gain provided that the gain is practically linear. This means that the distance readings will be fairly accurate even though the signal lines do not point at the beacons.

I claim:

1. In a system for measuring the distance of a mobile unit from a given point, the combination with a unit for radiating electromagnetic waves comprising more than two radio transmitters, each transmitter being located about a fixed point in such manner as to provide equal spacing between each pair thereof, and means to cause all of the transmitters to radiate successively during a period of measurement waves of the same frequency; of receiver means on a mobile unit including two directional receiving elements located at a predetermined angle to each other and means to tune both elements to the radiated frequency, together with two translation means operatively associated with the respective elements and tuning means, the whole affording two substantially identical receiver channels, cathode-ray tube means operatively coupled to said receiver channels and including a distance indicating scale whereby the received energy produces a pair of divergent linear traces cooperating with said scale to indicate said distance.

2. In a system for measuring the distance of a mobile unit from a given point, the combination with a unit for radiating electromagnetic waves comprising more than two radio transmitters, each transmitter being located about a fixed point in such manner as to provide equal spacing between each pair thereof, and means to cause all of the transmitters to radiate successively during a period of measurement waves of the same frequency; of receiver means on a mobile unit including two directional receiving elements located at a predetermined angle to each other and means to tune both elements to the radiated frequency, together with two translation means operatively associated with the respective elements and tuning means, the whole affording two substantially identical receiver channels, and means actuated from the respective translation means for affording visual linear traces of the relative positions of all of said transmitters, together with a scale associated with said actuated means cooperating with the linear traces thereof.

3. In a system for measuring the distance of a mobile unit from a given point, the combination with a unit for radiating electromagnetic waves comprising a group of three radio transmitters arranged in spaced relationship to form substantially an equilateral triangle, and means to cause all of the transmitters to radiate successively during a period of measurement waves of the same frequency; of receiver means on a mobile unit including two directional receiving elements located at a predetermined angle to each other and means to tune both elements to the radiated frequency, together with two translation means operatively associated with the respective elements and tuning means, the whole affording two substantially identical receiver channels, and means actuated from the respective translation means for affording visual linear traces of the relative positions of all of said transmitters, together with a scale associated with said actuated means cooperating with the linear traces thereof.

4. In a system for measuring the distance of a mobile unit from a given point, the combination with a unit for radiating electromagnetic waves comprising more than two circularly disposed equally spaced radio transmitters, and means to cause all of the transmitters to radiate successively during a period of measurement waves of the same frequency, and another group of more than two of circularly disposed, equally spaced radio transmitters occupying relatively less area than the first-named group and located within the boundary of the same, and means to cause all of the transmitters of the second-named group to radiate successively during a period of measurement rays of the same frequency but different from that of the transmitters of the first-named group; of receiver means on a mobile unit including two directional receiving elements located at a predetermined angle to each other and means to tune both elements to a radiated frequency for selecting a desired group of transmitters, together with two translation means operatively associated with the respective elements and tuning means, the whole affording two substantially identical receiver channels, and means actuated from the respective translation means for affording visual linear traces of the relative positions of all of the said transmitters of a selected group, together with a scale associated with said actuated means cooperating with the linear traces thereof.

5. In a system for measuring the distance of a mobile unit from a given point, the combination with a unit for radiating electromagnetic waves comprising more than two radio transmitters, each transmitter being located about a fixed point in such a manner as to provide equal spacing between each pair thereof, and means to cause all of the transmitters to radiate during a period of measurement waves of predetermined frequencies; of direction-finding means on the mobile unit including at least two fixed direction-determining antennae cooperating to afford from the transmitters differential energy effects and indicating means controlled by said effects for affording angular visual indications of the relative positions of the two transmitters providing the greatest angle, and a scale associated with the indicating means and cooperating with the angular indications thereof to indicate said distance.

EDWARD G. GAGE.